Figure 1:
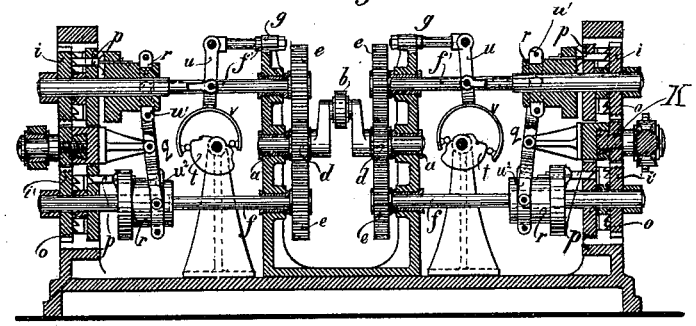

(No Model.) 3 Sheets—Sheet 1.

T. BOMM.
TRANSMISSION APPARATUS.

No. 403,637. Patented May 21, 1889.

Witnesses.
C. E. McDonald
H. Honig.

Inventor
Theodore Bomm
By his Attorneys
Fraser & Ebner (No Model.) 3 Sheets—Sheet 2.

T. BOMM.
TRANSMISSION APPARATUS.

No. 403,637. Patented May 21, 1889.

Witnesses
C. E. McDonald
H. Honig

Inventor
Theodore Bomm
By his Attorney
Finger & Ebner

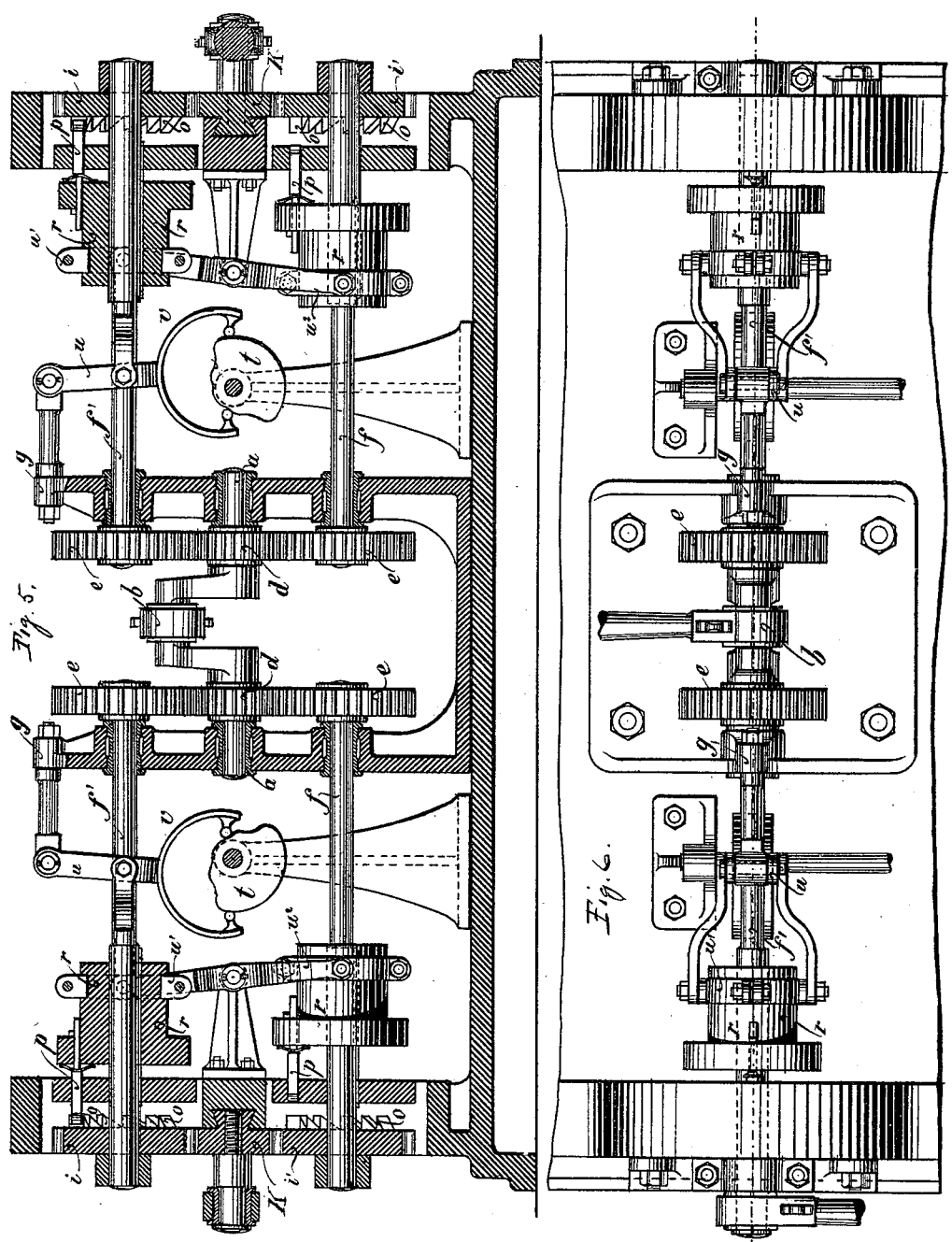

UNITED STATES PATENT OFFICE.

THEODOR BOMM, OF MÜHLHAUSEN, GERMANY.

TRANSMISSION APPARATUS.

SPECIFICATION forming part of Letters Patent No. 403,637, dated May 21, 1889.

Application filed May 12, 1888. Serial No. 273,741. (No model.)

*To all whom it may concern:*

Be it known that I, THEODOR BOMM, a subject of the Emperor of Germany, residing at Mühlhausen, in the Province of Thuringia, in the German Empire, have invented a new and useful Improvement in Transmission Apparatus, of which the following is a specification.

The nature of the invention consists in the details of combination and construction, substantially as illustrated in the drawings, hereinafter described, and subsequently pointed out in the claim.

Figure 2:
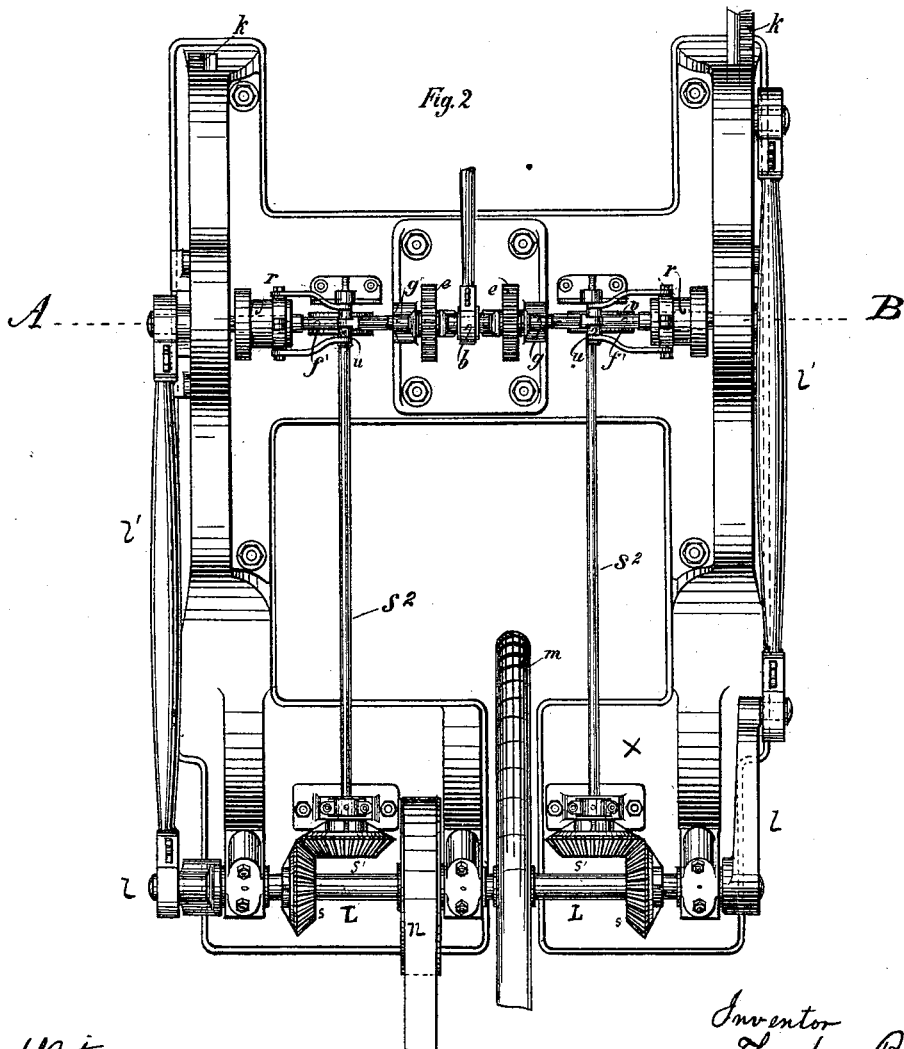
Figure 3:
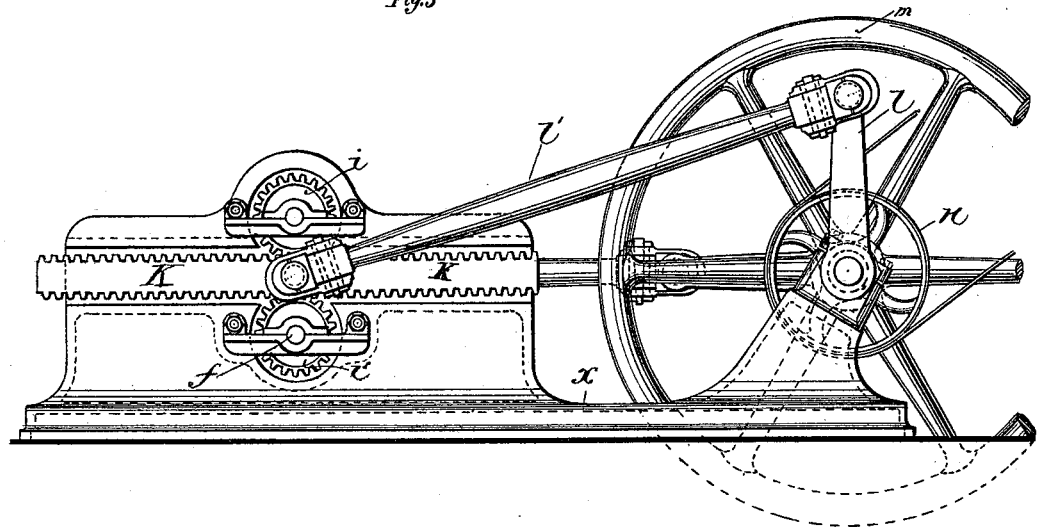
Figure 4:
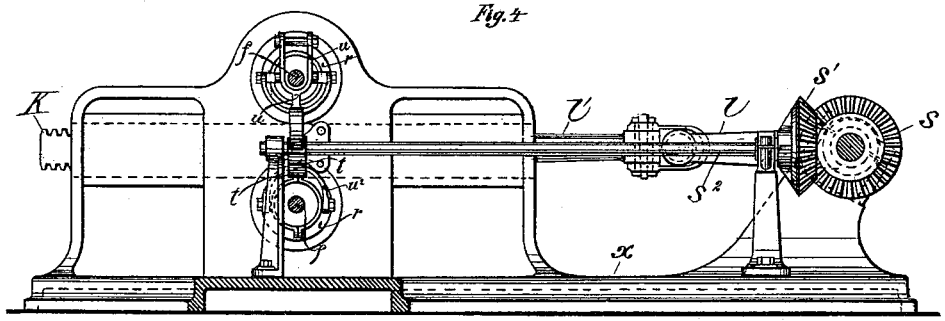

Figure 1 is a sectional view taken on the line A B of Fig. 2, illustrating my newly-invented transmitting apparatus. Fig. 2 is a plan view of the said apparatus. Fig. 3 is a partial side view of the same. Fig. 4 is a sectional view of the same on the line C D of Fig. 2. Figs. 5 and 6 are different end views of the same upon a larger scale.

L designates the main shaft, which is journaled in a bracket supported by the base-plate X. Upon this shaft L is mounted a fly-wheel, $m$, and a pulley, $n$. This shaft is also provided with wrist-cranks $l$, which are pivotally attached to the sliding racks K by the connecting-rods $l'$. These toothed racks K are free to slide endwise in grooves in the frame of the machine, so that they will mesh with the spur-wheels $i$ and $i'$.

In suitable bearings in the frame of the machine is mounted the crank-shaft $a$, upon which is mounted two spur-wheels, $d$, one on each end. The shafts $f$ and $f'$ are also mounted in bearings in the frame of the machine parallel to the shaft $a$. Upon each of these shafts $f f'$ is mounted a spur-wheel, $e$, meshing on each side into the wheels $d$ and $d$. On the outer ends of these shafts $f f'$ are mounted the spur-wheels $i$ and $i'$, which, as before said, mesh into the rack K. These four wheels $i$ $i'$ $i$ $i'$ are loose upon their shafts. On the inside face of each of these wheels is a crown-ratchet, (designated by $o$,) forming a true circle concentric with said wheels. Upon these shafts $f f'$ are also mounted the sleeves $r$, each of which carries a pawl, $p$, to engage the ratchets on the wheels $i$ $i'$. These sleeves are free to move endwise on the shafts $f f'$, but revolve with said shafts. Upon the main shaft L are mounted two bevel-wheels, $s$ and $s$, which mesh into corresponding bevel-wheels, $s'$ and $s'$, mounted on one end of the shafts $s^2$ and $s^2$. These shafts $s^2 s^2$, which are journaled in suitable bearings on the frame of said machine, carry the eccentrics $t$ upon their other ends. These eccentrics work in yokes $v$, which are rigidly attached to the oscillating levers $u$. These levers are pivotally attached by a post, $g$, to the frame of the machine. The collars $u^2$ are mounted in grooves in the sleeves $r$. On each side of the machine these collars $u^2$ are connected by the oscillating bars $q$. These bars are pivotally attached by proper studs to the frame of the machine. The sleeves $r$ on the shaft $f'$ are attached by the straps $u'$ to the oscillating levers $u$, so that when the levers $u$ move they also move the bars $q$ and the sleeves $r$. Motion may be communicated by a belt-connection between the pulley $n$ and any convenient motor, the whole machine to be as illustrated in the drawings. When this machine is put in motion, the racks K begin to move backward and forward in their slides, causing the wheels $i$ $i'$ to revolve rapidly. At the same time the shafts $s^2 s^2$ begin to turn, rotating the eccentrics $t$. These working in the yokes $v$ cause the levers $u$ and the bars $q$ to oscillate intermittingly. As one of the racks K moves away from the main shaft L, the one of the sleeves $u$ on the shaft $f'$ will be pushed toward the wheel $i$, so that the pawl $p$ will engage its crown-ratchet $o$. This fastens the wheel on the shaft, which causes the shaft to revolve and carry with it in its revolution the wheels $d$ and $e$ and the shaft $a$. This occurs simultaneously on either side. As the rack moves backward, the pawls are withdrawn from the wheels $i$ and pushed forward into engagement with the wheels $i'$. These in turn actuate their shafts and the accompanying mechanism, so that a continuous rotary motion in one direction is maintained by the shaft $a$. This motion may be either converted into a reciprocating motion by means of the crank $b$ of the shaft $a$ and suitable attachments thereto, or it may be utilized as a rotary motion by means of belts or other suitable connections.

What I claim as my invention, and desire to secure by Letters Patent, is—

The combination, with suitable supportingframe, $a$, main shaft L, mounted in suitable bearings in said frame, the fly-wheel $m$, the pulley $n$, and the wrist-cranks $l$, mounted upon said shaft, and the rod $l'$, connecting said crank with the sliding rack K of the shafts $a$, $f$, and $f'$, journaled in bearings in said frame, the wheels $e$ and $d$, mounted upon said shafts and meshing, as specified, the sliding racks K, meshing with the wheels $i$ and $i'$, sliding in a groove in said frame and actuated as specified, the wheels $i$ and $i'$, mounted upon the shafts $f f'$ and provided with crown-ratchets, the wheels $s$, mounted upon said shaft L, the shafts $s^2$, journaled upon said frame, the wheels $s'$, mounted upon said shafts $s^2$ and meshing with the wheels $s$, the eccentrics $t$, also mounted upon said shafts $s^2$ and working in the yokes $v$, said yokes $v$ attached to the oscillating levers $u$, said oscillating levers $u$, the straps $u'$, the collars $r$, mounted upon the shafts $f$ and $f'$ and constructed with pawl $p$, as specified, all substantially as and for the purpose set forth.

In witness whereof I have hereunto set my hand in presence of two witnesses.

THEODOR BOMM.

Witnesses:
BERNH. PORRSCHMANN,
CARL BORNGRAEBER.